The effect of different amounts of sodium tetrathionate on the activated (.02 M thioethanolamine) and unactivated activity of a crude dried latex containing 0.8 g of $Na_3PO_4 \cdot 12H_2O$ per 100 g of wet latex. The pH (right side of graph) was measured on a solution containing 2 mg of crude dried latex per ml. The specific activites are reported on the basis of dried latex.

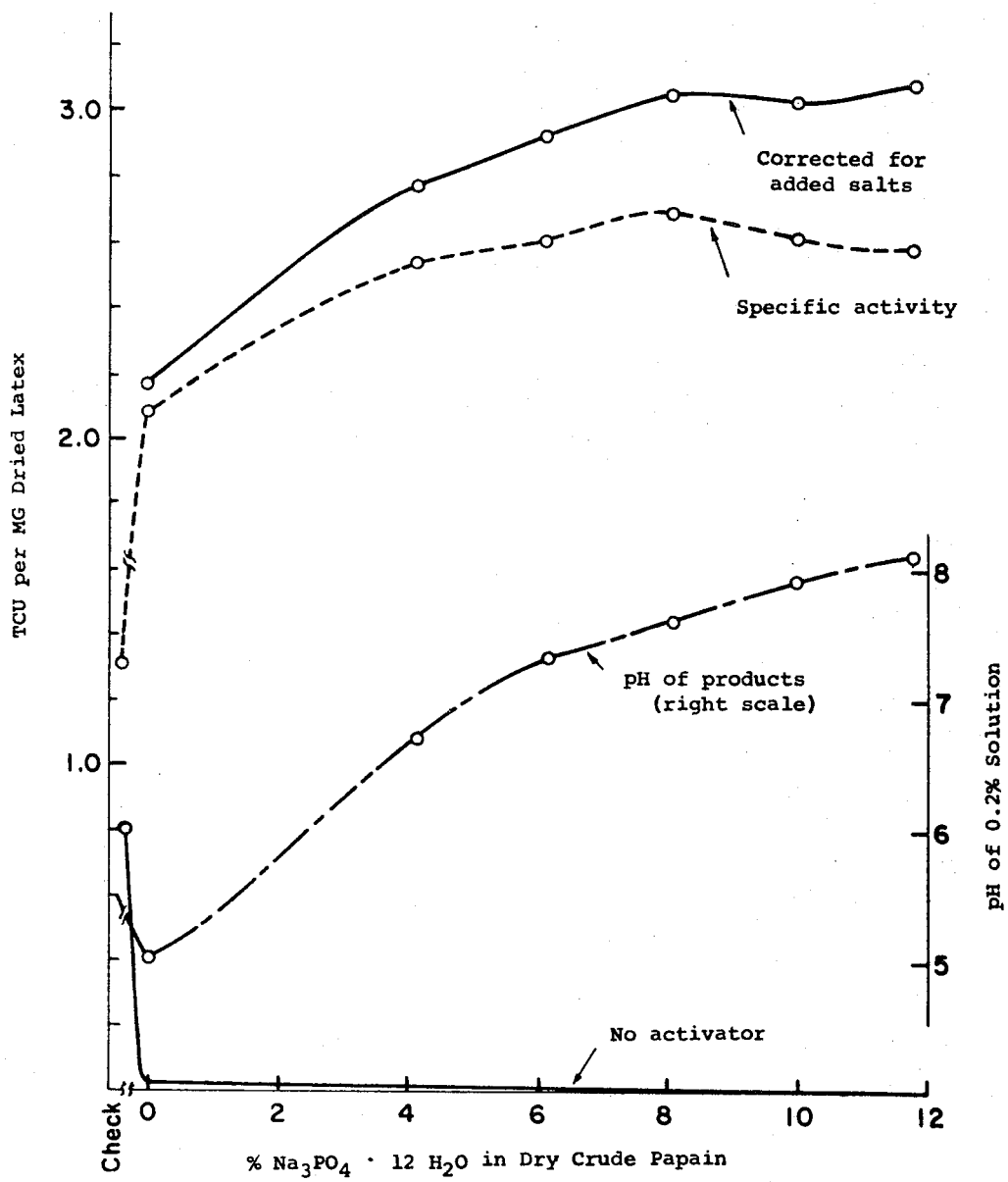

Figure 2
Effect of different amounts of $Na_3PO_4 \cdot 12 H_2O$ and 1 g of sodium tetrathionate added to 100 g of wet papaya latex (before drying) on the unactivated and activated protease activity of the dried latex. The weight of added buffer has been recalculated to a dry weight basis to make the graph applicable to latices of varying moisture content. The untreated sample had 1.31 unactivated TCU/mg and 0.80 "activated" TCU/mg and had a pH of 5.5.

3,539,451
PRODUCTION OF REVERSIBLY INACTIVATED PAPAIN AND FICIN
Ralph M. Heinicke, Honolulu, Hawaii, assignor to Castle & Cooke, Inc., Honolulu, Hawaii, a corporation of Hawaii
Filed May 31, 1968, Ser. No. 733,487
Int. Cl. C07g 7/022
U.S. Cl. 195—68                                  8 Claims

ABSTRACT OF THE DISCLOSURE

Fresh wet papaya or fig (Ficus) latex is reacted with enough tetrathionate at a pH in the range 6.5–8.0 to oxidize all sulfhydryl compounds. The treated latex is then dried to produce a crude dry material containing reversibly inactivated papain or ficin, with less loss of activity than when the latex is dried without such treatment. The inactive enzyme can be activated before or during separation from the crude material, but in most cases is separated and retained in inactive form until at or near the time of use.

BACKGROUND OF THE INVENTION

It is known that the plant "sulfhydryl" proteases, bromelain, papain and ficin, can be reacted with tetrathionate salts to inactivate the enzymes according to the reaction

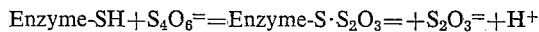

Enzyme-SH+$S_4O_6^=$=Enzyme-S·$S_2O_3^-$++$S_2O_3^=$+$H^+$

In the inactive form produced by the above reaction, the enzyme is completely stable against loss of activity through autolysis, but the reaction is reversible under mild reducing conditions so as to reactivate and regenerate the fully active enzyme which can then be used for any of the known purposes for which these proteases are useful. For example, they have been used for tenderizing meat, for the digestion of proteins, for the clarification of beverages, for the treatment of burns and wounds, etc.

My prior application, Ser. No. 693,612, filed Dec. 26, 1967 and entitled "Plant Proteases and Their Preparation and Use," discloses the use of such reversibly inactive or inactivated enzymes under various conditions of use such that the above reaction is reversed and the enzyme is reactivated in situ. This can take place, for example, in fresh meat where the inactive enzyme is either applied to the surface of the meat or is injected into the vascular system of the animal, in which case the naturally-occurring enzymes provide an environment such that the protease is reactivated. In other cases the enzyme can be mixed with any desired activator, usually a suitable sulfhydryl compound such as cysteine, thioethanol, etc., either in the dry state so as to reactivate the enzymes upon the addition of water at the time of use, or by mixing inactive enzyme and activator at the time of use in any suitable manner.

In the case of papain, the papaya latex is usually collected by placing a burlap covered hoop around the base of a papaya tree and then making three to four cuts on the green fruits so that the latex drips onto the burlap skirt where it coagulates. At intervals throughout the day the coagulated latex is taken to a collecting station, scraped off, and dried. In some operations 0.1–2% sodium bisulfite may be blended into the latex and the liquefied latex then held for a day before it is poured into trays and dried in an oven. In other operations thiosulfate may be blended into the latex. In the simplest method the latex is merely spread out on trays or squeezed through a collander to form ribbons which are dried in an oven. Sun drying, the original method, is no longer used by good plantation operators.

The Ficus latex may be collected from the fig trees by a technique very similar to that used in tapping rubber trees. However, in many areas the entire tree is cut down and only a single collection of latex is made from the trunk. Since the Ficus trees grow rapidly and are abundant in the tropical forests, this method is suitable for a "cottage" type enterprise. In contrast to papaya latex the Ficus latex from tree tapping is much more fluid. It may be acidified and shipped in liquid form to processing centers where it is purified and dried.

The crude dried latices can be treated with tetrathionate to oxidize the enzymes and produce reversibly inactivated enzymes as disclosed in my aforesaid prior application and in the above reaction formula. However, a substantial part of the activity originally present in the fresh latex is found to have been lost. These losses appear to have been due in large part to reactions which took place during drying in which sulfhydryl compounds in the latex reacted with the enzymes in such a way as to form irreversibly inactive enzymes.

SUMMARY OF THE INVENTION

By treating the fresh latices by the process disclosed hereinafter, as soon as possible after they are collected, the drying loss referred to above can be avoided or at least greatly reduced. This can be accomplished by removing or destroying non-enzymic sulfhydryl groups in the latex in any suitable manner, and then oxidizing the remaining enzymic sulfhydryl groups with tetrathionate to produce the reversibly inactive enzymes described above. The latex may now be dried substantially without loss of its original activity.

It has been found that papaya and to a lesser degree Ficus latices have relatively high sulfhydryl contents, a large part of which is due to the presence of glutathione. In a fresh papaya latex in particular, the amount of sulfhydryl may be as high as 30–40 or more micromoles per g., only a small part of which is due to the enzyme. In the presently preferred method, this fresh latex is treated with enough sodium tetrathionate to achieve the dual result of oxidizing the non-enzymic sulfhydryl groups and also of reacting with the enzymic sulfhydryl groups. Accordingly a large excess of tetrathionate is required above the amount needed to produce a reversibly inactive enzyme, in order to insure oxidation of all of the sulfhydryl groups and to avoid loss of activity during drying.

However, the use of tetrathionate as just described gives rise to a further problem because the reaction of the tetrathionate with sulfhydryl groups in the latex releases a substantial amount of acid according to the reactions:

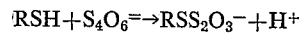

$RSH+S_4O_6^=\rightarrow RSS_2O_3^-+H^+$ or

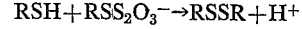

$RSH+RSS_2O_3^-\rightarrow RSSR+H^+$

For a simple sulfhydryl molecule, such as cysteine, the liberation of one mole of $H^+$ per mole of reacted RSH is stoichiometric over a pH range of 4.5–8.5. However, for more complex sulfhydryl compounds, such as proteins, thioglycerol, or glutathione, competing reactions begin to occur below pH 6.5 These competing reactions lead to by-products which increase the consumption of tetrathionate, which liberate the thiosulfate group from reacted protein, and which irreversibly inactivate a certain percentage of the enzyme. To obtain high yields of inactivated enzyme with a minimum of tetrathionate the pH should be between pH 6.8 and 8.2, preferably at pH 7.5±0.5 during the course of the reaction.

In order to prevent or minimize such undesirable competing reactions, the present invention includes neutralization of the acid formed during the tetrathionate reaction by the addition of suitable buffers to the wet latex. It is desirable to check the pH on the plantation by the use of indicator paper or other suitable means, and to adjust the amount of buffer used so as to maintain pH in the desired range throughout the course of the reaction.

The buffer used should be one which is compatible with food and drug uses, which does not harm the enzyme, and which is inexpensive. The most suitable buffers for use in wet papaya latex are tribasic phosphates, dibasic carbonates, and ammonium hydroxide. The first two of these buffers are preferred, being solids and easier to handle, and also having excellent buffer capacity in the desirable pH range for the tetrathionate reaction. In Ficus latex, where the need for buffering is less, dilute NaOH, KOH, and $NH_4OH$ are effective, although of course the buffers recommended for papaya latex can be used in Ficus latex as well.

The method of adding the tetrathionate and buffer salts will depend on the moisture content of the latex. Freshly collected papaya latex contains about 78% moisture whereas latex which has been exposed to the air for several hours may have no more than 50% moisture. Moist latices have sufficient water to dissolve the dry salts easily, but with drier latices it may be necessary to dissolve the tetrathionate in a minimum amount of water and work the solution into the pasty latex. The buffer salts can then be added either as dry salts or as a solution and the mixing continued until all of the salts have dissolved.

The quantities of tetrathionate used in the examples given hereinafter were based on freshly collected papaya latices which contained practically all of the naturally occurring sulfhydryl compounds so that these quantities represent the approximate maximum amounts of tetrathionate and buffer which will be required in each case. Under commercial harvesting practices part of the sulfhydryl compounds may be oxidized before the latex is brought to the collecting stations, and if so less tetrathionate and less buffer is needed.

In the Ficus or fig latex, the amount of naturally occurring non-enzymic sulfhydryl due to glutathione and the like is much less than in papaya latex, but still there is a loss of activity during drying for the above reasons and it is beneficial to follow the same procedure of removing or destroying non-enzymic sulfhydryl groups in the fig latex, before treating the enzymic sulfhydryl groups with tetrathionate.

The reversibly inactivated enzyme can be recovered from the treated latex in any desired manner, with or without reactivation. If the latex is dried, the dry powder can be shipped to processing centers where it can be redissolved in water and the enzymic constituents recovered by known methods such as precipitation with acetone or the like; see, for example, my prior Pats. Nos. 3,002,891 and 3,293,143. Where feasible, the treated latex, while still liquid and before drying, can be treated in the same manner.

For reactivating the reversibly inactivated enzyme, its thiosulfate group can be replaced easily by any simple sulfhydryl compound, either in conjunction with purification or subsequently at or near the time of use as mentioned above. The only limitations on the choice of compound to be used are that it must not be toxic, should not have too strong an odor and should not be too high in cost. Cystein is commonly used, being a normal food constituent without strong odor. Thioethanol, while having a moderately strong odor, is considerably less expensive than cysteine and is nontoxic in any amount that might be ingested with the enzyme.

BRIEF DESCRIPTION OF THE DRAWINGS

The accompanying drawings are graphs of test data which, together with the data in the tables set forth hereinafter, support the statements made above and establish the preferred operating conditions for the process.

In the drawings:

FIG. 2 shows the effect of different amounts of trisodium phosphate, with a constant amount of tetrathionate, on the specific activity of papaya latex.

DESCRIPTION OF THE PREFERRED EMBODIMENTS

Figure 1:
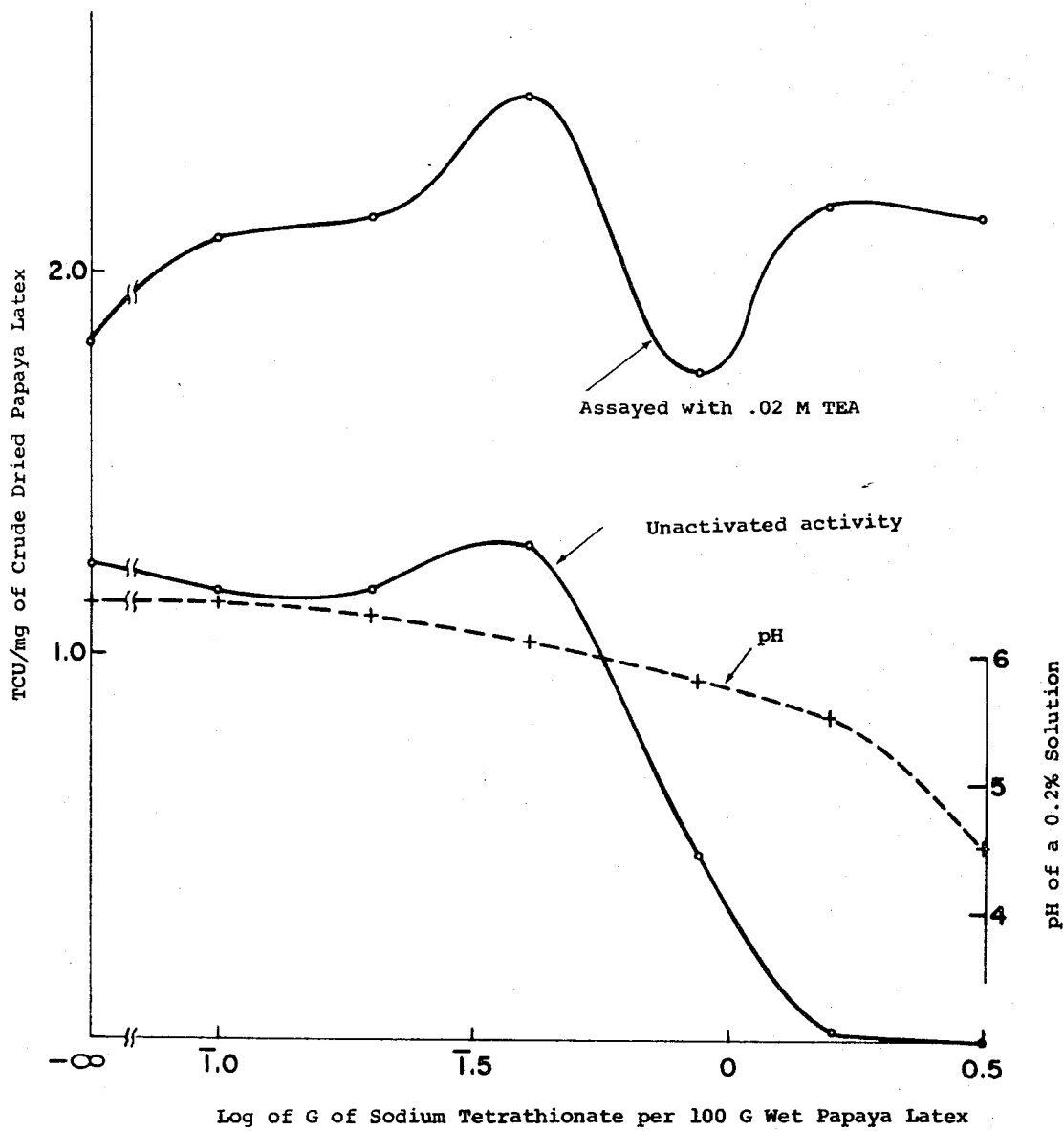
FIG. 1 shows the effect of different amounts of tetrathionate with a constant amount of buffer on the specific activity of papaya latex.

In considering the data plotted in FIGS. 1 and 2 and set forth in the following tables, it should be borne in mind that all assays of activity were made by the Kunitz casein digestion method. A Tecnicon Autoanalyzer was used, which was arranged either to dilute the enzymes or to both dilute and activate the enzymes. All activations were made with 0.02 M thioethanolamine solution (TEA) in 1% NaCl, the activation time being 2.2 minutes at 25° C. Specific activity was measured in terms of TCU (Tyrosine Casein Unit). One TCU represents that quantity of enzyme which will produce in one minute of digestion at 30° C. an amount of casein soluble in a 3.7% trichloroacetic acid solution which has an absorbency at 280 millimicrons equivalent to a one micromolar solution of tyrosine.

As already stated, a large part of the sulfhydryl content of fresh papaya latex is due to the presence of sulfhydryl compounds such as glutathione, cysteine and the like. In the preferred method, therefore, most of the tetrathionate required for a complete oxidizing reaction will be used in oxidizing such relatively simple sulfhydryl groups rather than the enzyme or protein groups. FIG. 1 illustrates the fact that oxidation takes place first at the simple sulfhydryl groups in preference to the protein or enzyme, the specific activity of the unactivated enzyme remaining more or less the same until a substantial amount of tetrathionate has been used. The subsequent oxidation of the enzymic sulfhydryl groups is clearly indicated by the rapid decline of specific activity of the unactivated latex beginning at about the midpoint of the graph.

FIG. 1 also shows that the amount of buffer used (0.8 g. of $Na_3PO_4 \cdot 12H_2O$) was not sufficient to neutralize all of the acid liberated by the oxidation of the sulfhydryl groups, with the result that the pH of the wet latex (and of the subsequently dried latex as well) decreased to an undesirably low value.

Another significant conclusion from FIG. 1 is that the total activated protease recovery increases as the tetrathionate content and the oxidation of the simple sulfhydryl groups increase up to about the midpoint of the graph. The finding that oxidation of these small molecule sulfhydryl groups is beneficial is quite unexpected, since prior common practice and theory indicated that sulfhydryl compounds should improve the recovery of enzyme.

FIG. 2 shows that the specific activity of the dried latex remained relatively constant over a range of 0.64–1.93 moles of trisodium phosphate per mole of tetrathionate (or a pH range of 6.8–8.2), but that the best total recovery of enzyme occurred over the range of 1.28–1.93 moles of basic buffer per mole of tetrathionate because of the salt dilution effect. Preferably, therefore, sufficient buffer should be used to neutralize all of the acid produced during the tetrathionate reaction plus enough base to raise the pH to 6.8–8.2.

Dry sodium tetrathionate and trisodium phosphate can be premixed for use in the process preferably in a favorable molar ratio according to FIG. 2. The following Table I shows the result obtained with a molar ratio of 1:1.4, using different quantities of this premix with fresh latex. With this latex an acceptable enzyme was obtained with a molarity of sodium tetrathionate between 0.037 and 0.046. This mixture of buffer and tetrathionate kept the pH within the desired range regardless of the amount used.

then clarified by filtration, centrifugation, etc., and from which the enzyme is recovered by known methods such as spray drying (or freeze drying of small samples), acetone precipitation, etc. Depending on the solution used, the recovered enzyme may be either active or reversibly inactive. In the case of acetone precipitation the wet precipitate is then dried. For best results, these final drying steps should be carried out at a pH in the range of 5.0–6.0.

A reprocessing solution containing about 10–20% of the crude dried latex is suitable. When the reversibly inactive enzyme is desired, it is advantageous to redissolve the crude dried latex in a mild solution of tetrathionate, say 0.005 M $Na_2S_4O_6$. When the active enzyme is desired, the solution may contain a sulfhydryl activator such as thioethanol or cysteine, about one part of activator to 100 parts of crude dried latex being usually enough.

TABLE I.—PREPARATION OF REVERSIBLY INACTIVE CRUDE PAPAIN BY INCORPORATING VARIOUS AMOUNTS OF A PREMIXTURE OF DRY SODIUM TETRATHIONATE AND SODIUM PHOSPHATE [1] INTO THE WET LATEX BEFORE AIR DRYING

| G. of salt mix per 100 g. of latex | M of tetrathionate | pH [2] | Specific activity TCU per q. Not act. | Specific activity TCU per q. 0.02 M TEA | TCU* recovered from 100 g. wet latex, 0.02 M TEA |
|---|---|---|---|---|---|
| 0 | 0 | 5.6 | 1,000 | 1,747 | 40,900 |
| 1.5 | .0185 | 6.9 | 1,098 | 2,400 | 57,450 |
| 2.25 | .0278 | 7.1 | 295 | 2,250 | 55,100 |
| 3.0 | .0370 | 7.6 | 200 | 2,325 | 58,000 |
| 3.75 | .0462 | 7.95 | 150 | 2,450 | 62,000 |

The latex was dried in thin films in a forced hot air oven at 50° C.
[1] This was hydrated trisodium phosphate (MW=380).
[2] The pH was measured on a 0.2% solution of dissolved dried powder.
* The enzyme was activated with a 0.02 M thioethanolamine solution.

Table II shows results obtained using the method of the present invention in comparison with three different methods of producing dried crude papain which have been used heretofore. The superiority of the tetrathionate procedure over these prior methods is clearly evident.

TABLE II.—COMPARISON OF THE YIELDS AND QUALITY OF DRIED PAPAYA LATEX USING THE STANDARD METHOD, THE BISULFITE METHOD AND THE TETRATHIONATE METHOD

| Additives, g./100 g. wet latex | G. dry solids/ 100 g. wet latex | pH | Specific activity Not act. | Specific activity 0.02 M TEA | Total recovery/100 g. wet latex Not act. | Total recovery/100 g. wet latex 0.02 M TEA |
|---|---|---|---|---|---|---|
| Standard method (no added salts) | 22.4 | 5.55 | 1,175 | 2,250 | 26,300 | 50,500 |
| 1.75% $NaHSO_3$ | 25.6 | 6.5 | 1,098 | 1,652 | 28,100 | 42,400 |
| 0.9% $NaHSO_3$ | 24.7 | 6.45 | 1,167 | 1,733 | 28,850 | 42,850 |
| 0.75% NaTT plus 1.75% $Na_3PO_4$ | 25.1 | 7.65 | 150 | 2,500 | 3,970 | 62,800 |

The samples were dried in a forced air oven at 50° C.

Commercial reprocessors of crude, dried tetrathionate-treated usually redissolve the latex in a solution which is Tables III and IV illustrate typical results obtained by reprocessing crude, dried papaya latex in various ways.

TABLE III.—COMPARISON OF DIFFERENT METHODS OF REPROCESSING DRIED PAPAYA LATEX TO PRODUCE EITHER AN ACTIVE PAPAIN OR A REVERSIBLY INACTIVE PAPAIN

| Treatment | pH of the final product | G. 100 g. of wet latex | Reprocessed enzyme TCU/gl Not act. | Reprocessed enzyme TCU/gl 0.02 M TEA | Total TCU per 100 g wet latex |
|---|---|---|---|---|---|
| (1) Standard drying and reprocessing procedure (no chemicals) | 5.45 | 13.5 | 1,383 | 1,057 | 18,700 |
| (2) Tetrathionate latex powder; reprocessed | 6.8 | 15.4 | 230 | 2,262 | 34,900 |
| (3) Tetrathionate latex powder; redissolved in 0.005 M sodium tetrathionate, reprocessed | 6.8 | 15.1 | 25 | 2,563 | 38,720 |
| (4) Tetrathionate latex powder; redissolved in water containing 1 ml. of $HSC_2H_5OH$ per 100 g. of dried latex powder | 6.65 | 15.75 | 1,185 | 1,673 | 29,700 |

All treatment started with the same quantity of wet papaya latex. The yield figures include the drying step and the losses during the reprocessing clarification step.

TABLE IV.—COMPARISON OF "SPRAY DRYING" VS "ACETONE PRECIPITATING" A FILTERED 10% SOLUTION OF TETRATHIONATE TREATED PAPAYA LATEX

| Final protein Recovery step | Yield per 100 g. dry latex | TCU/g. Not act. | TCU/g. 0.02 M TEA | Total TCU |
|---|---|---|---|---|
| "Spray drying" (freeze drying) | 46.7 | 22 | 2,200 | 103,000 |
| Acetone precipitation | 43.4 | 120 | 2,667 | 115,700 |

The following are typical examples of the operation of the invention:

EXAMPLE 1

To 100 g. of fresh papaya latex containing 22.8% solids and having an activity of 420 unactivated and 625 activated TCU/g. I added 1.75 g. of $Na_3PO_4$ and 0.75 g. of $Na_2S_4O_6$. During the mixing process the pasty latex became quite fluid. The liquid mixture was poured onto a drying pan to form a liquid layer which was about 3 mm. thick. This was dried overnight in a forced draught hot air oven at 50° C.

This part of the operation simulated the operations carried out at the papaya plantations. The yield of crude latex powder including the added salts was 25.1 g. per 100 g. of original wet latex. The activity of the redissolved but uncentrifuged crude latex powder was 158 (unactivated) and 2500 activated TCU/g. This represents a recovery of 100.5% of the activated protease units originally present in the latex. The standard drying procedure recovered 81% of the activated activity.

EXAMPLE 2

Ten g. of crude dried inactivated latex (from Example 1) was dissolved in 45 ml. of water containing 0.0607 g. of sodium tetrathionate (a 0.005 M solution). The solution was centrifuged and freeze dried to simulate spray drying.

Yield=7.4 g./10 g. of crude latex.

TCU/g. (unact.)=176; activated 2335. The recovery based upon the activity in the crude dried latex was 94.5%.

EXAMPLE 3

Ten grams of crude inactivated dried papaya latex was dissolved in 45 ml. of water containing 0.08 g. of $HSC_2H_5OH$ and the solution adjusted to pH 5.5 The material was centrifuged and freeze dried.

Yield 8.6 g/10 g. crude dried latex.

TUC/g. unact.)=1,748; act. 2,360.

Recovery (activated) 111%.

EXAMPLE 4

To 100 g. of fresh papaya latex having 23.7% solids were added at the same time 0.5 g. of $Na_2CO_3$ and 0.75 g. of sodium tetrathionate. After thoroughly mixing the latex and dry salts together until the salts were dissolved, the liquefied latex was poured into a pan and air dried in a forced air oven at 50° C.

|  | $NaTT+Na_2CO_3$ | Standard treatment |
|---|---|---|
| Yield/100 g. wet latex, g | 23.7 | 22.7 |
| pH of a 0.2% solution | 7.3 | 5.6 |
| Unactivated TCU/g | 330 | 1,750 |
| Activated (.02 M TEA) TCU/g | 2,927 | 1,400 |
| Total TCU/100 g. wet latex | [1] 69,400 | [2] 39,800 |

[1] Activated.
[2] Since the "activator" inhibited this sample of papain, the total yields are calculated on the larger of the two assay figures, that is, the unactivated assay. The standard treatment sample was the same latex dried in the same oven for the same length of time but with no added chemicals.

EXAMPLE 5

Ten ml. of South American ficin latex at pH 4.7 was adjusted to pH 7.5 with dilute sodium hydroxide. To this was added 0.0053 g. of sodium tetrathionate. (The molarity of tetrathionate was 0.002 M.) The material was air dried at 50° C. The pH of a 0.2 mg. solution of dried powder was pH 7.3.

The activity of the treated sample was 18 TCU/g. unact. and 1945 TCU/g. activated.

The activity of an untreated sample of latex dried in the same oven for the same length of time was 168 TCU/g. unact. and 182 TCU/g. act.

It will be understood that the invention is not limited to the details of the foregoing description and examples and that reference should be had to the appended claims for a definition of its limits.

I claim:

1. A method for producing a reversibly inactive plant sulfhydryl protease which comprises the steps of extracting plant latex containing enzymic sulfhydryl groups and non-enzymic sulfhydryl groups, eliminating the non-enzymic sulfhydryl groups from the fresh latex, then treating the fresh latex with sodium tetrathionate in amount sufficient to oxidize substantially all the remaining enzymic sulfhydryl groups while buffering the latex to neutralize liberated acid and to maintain a pH in the range 6.5 to 8.2 throughout the tetrathionate reaction, and then drying the treated latex.

2. A method as defined in claim 1, the amount of sodium tetrathionate being the equivalent of the total sulfhydryl content of the fresh latex and said tetrathionate first reacting with and eliminating the non-enzymic sulfhydryl and then oxidizing the remaining enzymic sulfhydryl.

3. A method as defined in claim 1, said latex being papaya latex and said pH range being 6.8 to 8.2, the enzyme being papain.

4. A method as defined in claim 3, wherein the buffer added to the latex is selected from the group consisting of tribasic phosphate salts and dibasic carbonate salts.

5. A method as defined in claim 1, said latex being fig latex and said pH range being 7.0 to 8.0, the enzyme being ficin.

6. A method as defined in claim 5, wherein the buffer added to the latex is selected from the group consisting of sodium, potassium and ammonium hydroxides.

7. A method as defined in claim 1, including refinement of the reversibly inactive enzyme by dissolving the crude dried latex of claim 1 in a 0.001-0.005 M solution of sodium tetrathionate, clarifying the solution and then recovering the refined inactive enzyme from the solution in dry form.

8. A method as defined in claim 1, including refinement and activation of the reversibly inactive enzyme by dissolving the crude dried latex of claim 1 in a solution containing a sulfhydryl activating agent, clarifying the solution, and then recovering the refined active enzyme from the solution in dry form.

References Cited

UNITED STATES PATENTS 3,274,072  9/1966  Burdick _____ 195—66 X

OTHER REFERENCES

Sanner et al., Journal of Biological Chemistry, vol. 238, pp. 165–171 (January 1963).

LIONEL M. SHAPIRO, Primary Examiner

U.S. Cl. X.R.

195—66